United States Patent
Baltar et al.

(10) Patent No.: US 9,882,911 B2
(45) Date of Patent: Jan. 30, 2018

(54) AUTONOMOUS TRUST EVALUATION ENGINE TO GRANT ACCESS TO USER PRIVATE DATA

(71) Applicant: International Business Machines Corporation, Armonk, NY (US)

(72) Inventors: Alexandre de Queiroz Baltar, São Paolo (BR); Silvia Cristina Sardela Bianchi, São Paolo (BR); Marcio da Ros Gomes, Campinas (BR); Marcos Vinicius Landivar Paraiso, São Paolo (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/955,154

(22) Filed: Dec. 1, 2015

(65) Prior Publication Data

US 2017/0155659 A1    Jun. 1, 2017

(51) Int. Cl.
*G06F 21/62* (2013.01)
*H04L 29/06* (2006.01)

(52) U.S. Cl.
CPC .......... *H04L 63/102* (2013.01); *H04L 63/105* (2013.01)

(58) Field of Classification Search
CPC ............................. H04L 63/10; G06F 21/60
See application file for complete search history.

(56) References Cited

U.S. PATENT DOCUMENTS

| | | | |
|---|---|---|---|
| 6,381,602 B1 | 4/2002 | Shoroff et al. | |
| 7,380,120 B1 | 5/2008 | Garcia | |
| 7,458,102 B2 | 11/2008 | Rogers et al. | |
| 7,716,490 B2 | 5/2010 | Kanai | |
| 8,224,755 B2 | 7/2012 | Goodman et al. | |
| 8,549,628 B2 | 10/2013 | Vasireddy et al. | |
| 8,776,180 B2 | 7/2014 | Kumar et al. | |
| 8,805,881 B2 | 8/2014 | Hom et al. | |
| 2003/0154403 A1 | 8/2003 | Keinsley et al. | |
| 2006/0047725 A1 | 3/2006 | Bramson | |
| 2006/0048224 A1 | 3/2006 | Duncan et al. | |
| 2007/0101400 A1* | 5/2007 | Freeman ............... | H04L 9/0841 726/2 |
| 2013/0212711 A1 | 8/2013 | Radkowski et al. | |
| 2013/0227712 A1 | 8/2013 | Salem et al. | |
| 2014/0259164 A1 | 9/2014 | Fly et al. | |

* cited by examiner

Primary Examiner — Izunna Okeke
(74) Attorney, Agent, or Firm — Louis J. Percello; Ryan, Mason & Lewis, LLP

(57) ABSTRACT

A trust rating is computed for a data requester across one or more dimensions by identifying the data requester, collecting information regarding the data requester from one or more sources, and generating the trust rating for the data requester across the one or more dimensions based on the collected information. The trust rating is utilized to either grant or deny a request by the data requester to access data associated with one or more data providers.

13 Claims, 6 Drawing Sheets

100

200

AUTONOMOUS TRUST EVALUATION ENGINE TO GRANT ACCESS TO USER PRIVATE DATA

BACKGROUND

Organizations are increasingly generating large volumes of data as a result of a proliferation of new technologies such as social networks, mobile devices, sensors, and cloud computing. As the volume of data increases, concerns are raised about privacy, and users demand more control over the data that they provide.

SUMMARY

Embodiments of the invention provide techniques for trusted data access.

For example, in one embodiment, a method comprises the following steps. A trust rating is computed for a data requester across one or more dimensions. The trust rating is computed by identifying the data requester, collecting information regarding the data requester from one or more sources, and generating the trust rating for the data requester across the one or more dimensions based on the collected information. The trust rating is utilized to either grant or deny a request by the data requester to access data associated with one or more data providers.

Advantageously, illustrative embodiments provide an autonomous trust evaluation engine to grant access to user private data.

DETAILED DESCRIPTION

Illustrative embodiments of the invention will be described herein in the context of illustrative methods, systems and apparatus for autonomously computing a trust index and granting access to private data based on the trust index. However, it is to be understood that embodiments of the invention are not limited to the illustrative methods, systems and devices but instead are more broadly applicable to other suitable methods, systems and devices.

Controlling access to personal data is a growing field in data management driven mostly by the increasingly large volumes of data available over the web (i.e., World Wide Web) or some other network. A large portion of available data is created by private consumers whose concerns for privacy have risen in relation to the increase in available data. That is, a user may desire to understand and control who has access to his or her personal data. For example, an user may wish that a medical record be available for viewing only by his or her medical clinic. As another example, a user's concern may be the trustworthiness of a company that has access to his or her financial records.

Figure 1:
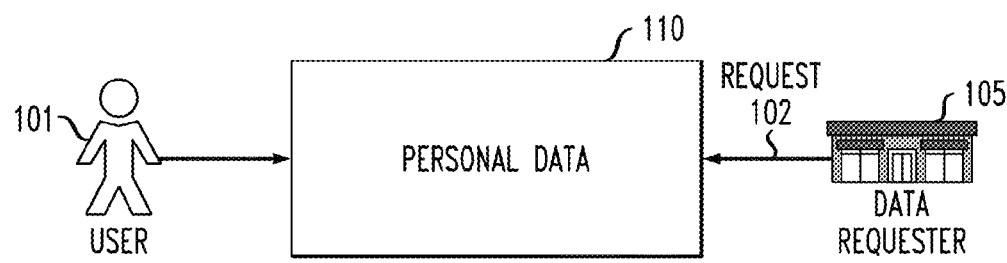
FIG. 1 illustrates a methodology for requesting access to personal data of a user.

FIG. 1 depicts a typical methodology 100 for requesting access to an user's personal (private) data. As shown, an user 101 provides personal data 110 to one or more data processing systems (not expressly shown). Personal data 110 may include, but is not limited to, financial, educational, medical, and professional records. A data requester 105 submits a request 102 for access to some portion of the personal data 110. Assume that the user has set some access control policies that attempt to control access to the private data. However, once access is granted, anyone with the access rights can view the private data 110. Thus, in typical existing scenarios such as what is shown in FIG. 1, the user 101 is unable to know the trustworthiness of the entities that are requesting and accessing his/her private data, and is therefore unable to control access based on trustworthiness.

Advantageously, illustrative embodiments provide efficient techniques for controlling access to a user's personal data from a user-management perspective, based on the trusted identification of the requester and user-selected dimensions on which the trustworthiness of the requester is rated. Further, illustrative embodiments provide a trustable analysis leveraging different dimensions to build a requester's trust rating and granting access based on that trust rating.

Figure 2:
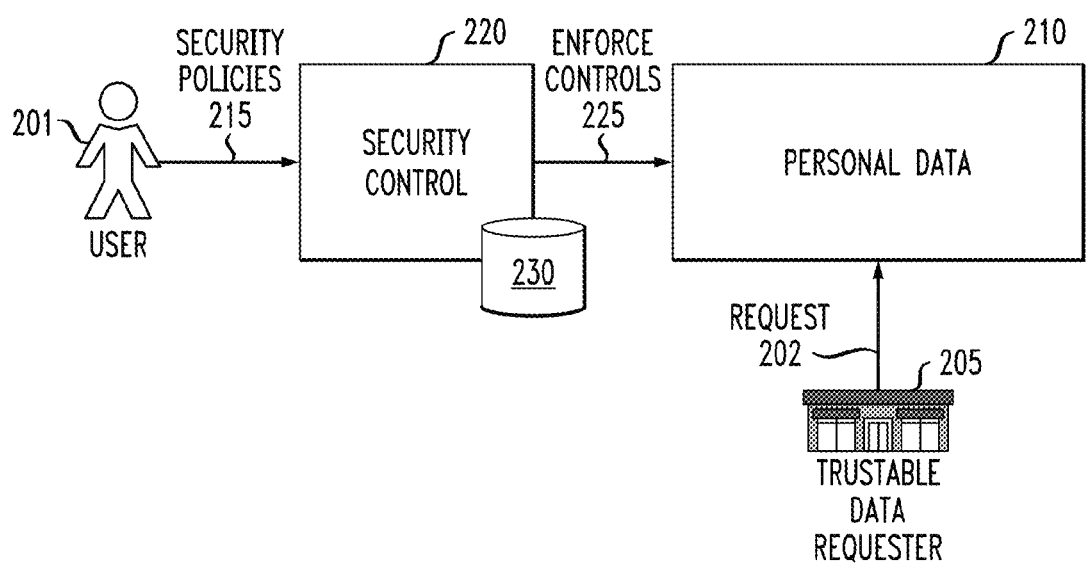
FIG. 2 illustrates a methodology for enforcing security controls in requesting access to personal data of a user, according to an embodiment of the invention.

FIG. 2 depicts a methodology for enforcing security controls in requesting access to a user's personal data, according to an embodiment of the invention. Advantageously, embodiments herein allow the user 201 to select and enforce security policies to determine whether a requester is granted access to personal data 210. For example, the user 201 provides security policies 215. The security control 220 stores these policies in database 230 then enforces those policies in step 225 to grant access to personal data 210. The granting of the request 202 is based on the identity of the trustable data requester 205. The granting of the request and enforcing security controls is further delineated below in the context of FIGS. 3 and 4.

As will be explained in further detail herein, illustrative embodiments provide an autonomous trust evaluation engine to grant access to user private data. The method calculates the trust rating of an entity (company or individual) using a set of input and criteria information leveraged from external sources such as, but not limited to, social media, review sites, e-commerce, known data, etc. The trust rating takes into consideration dimensions such as, but not limited to, confidentiality, integrity, authenticity, compliance, and availability. These dimensions may be selected by a user, and combined to form an overall (composite) trust rating. Additional capabilities/features such as, but not limited to, the ability to define a list of attributes or preferences based on his/her interests in order to control access to the data, can be enabled by the provider or owner of the data. Also, this trust level can continuously be reviewed through a feedback mechanism. The user's private data is classified per category and data related thereto is contained in a logical secured container where relevant information for the specific area is stored. Therefore, a list of logical security containers categorized by subject such as, but not limited to, medical, education, business, etc., are used to allow access to the information.

Advantageously, these techniques allow the user to have more control over the data distribution, with knowledge of who has (and had) access to the data and for how long, as well as improving data consistency by centralizing authorizations for access. Also, control access is continuously being reviewed through feedback mechanisms. Further, additional data access control such as, but not limited to, temporality, criticality, and sensitivity, can be leveraged into access rules capabilities.

Figure 3:
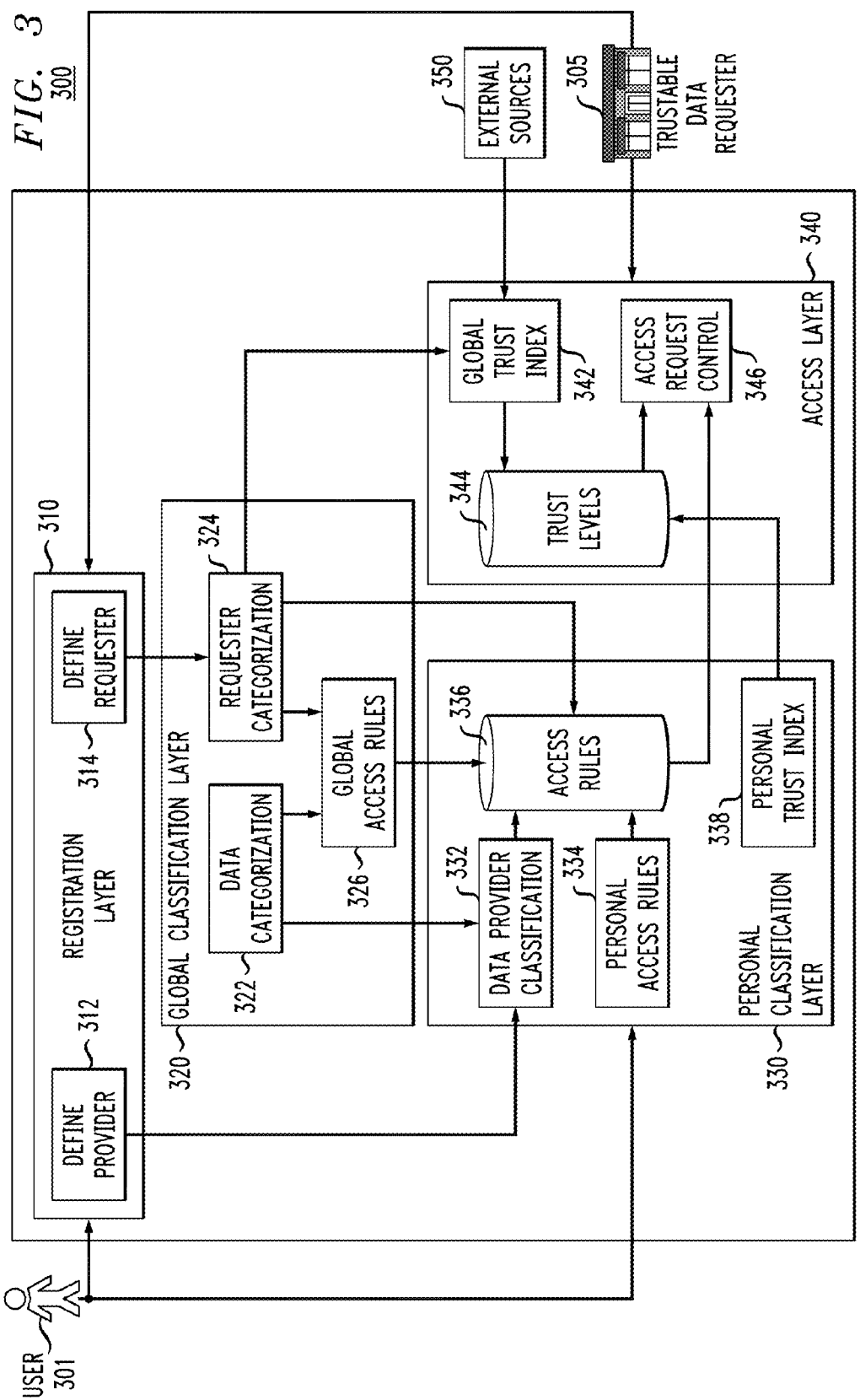
FIG. 3 illustrates a system for computing a trust index and granting access to data, according to an embodiment of the invention.

FIG. 3 depicts an overall system 300, according to an embodiment of the invention. The illustrative system comprises four main functional layers: a registration layer 310, a global classification layer 320, a personal classification layer 330, and an access layer 340.

The registration layer 310 is responsible for defining, e.g., identifying and registering, the user 301 and the trustable data requester 305. The user 301 is defined in step 312 as the provider of personal data, and the trustable data requester 305 is defined in step 314. It is to be understood that a "user" or data provider/owner may be an individual or an entity such as, but not limited to, a company, business, etc. It is realized that individuals and companies generate large volumes of data, e.g., from mobile phones, sensors such as a global positioning system (GPS), social media, financial transactions, medical records, and files. The data is stored in a shared information technology (IT) infrastructure such as a cloud infrastructure where the user may specify a list of attributes or properties in order to control the access for other systems, enterprises, or friends to have access. Thus, the identifying and registering of the data providers and data requestors is important to developing a trustworthy system since a data provider will have confidence in knowing that only registered data requestors will attempt to access his/her private data.

The global classification layer 320 comprises data categorization 322, requester categorization 324, and generation of global access rules 326. More specifically, at the global classification layer 320, the data provided by user 301, and the data requester 305, are respectively categorized (data in step 322 and data requester in step 324). Such categorizes may comprise categories (classifications) such as, but not limited to, medical, financial, professional, educational, etc. From these categorizations, global access rules 326 are generated.

In one example, assume that a global access rule is that only medical clinics can access medical records. Thus, if the data provided by the user is his/her medical record and categorized as "medical," then according to the generated global rule, only data requestors categorized as "medical" can access the medical record of the user. Accordingly, a medical clinic could access the data according to the global rule but could not access financial data of the user. Similarly, a financial institution could not access the user's medical record.

The personal classification layer 330 comprises a data provider classification 332 and generation of personal access rules 334. The data provider classification 332 is determined from step 312 at the registration layer 310. Personal access rules 334 are rules that are generated for the specific data provider that override global access rules 326. In one example, a personal access rule for a given data provider may specify that a medical clinic outside his/her city cannot access his/her medical data. Such personal access rules 334 (identified for the given data provider via data provider classification 332) are stored in access rules database 336 along with global access rules 326.

The personal classification layer 330 also comprises a personal trust index 338. The personal trust index 338 enables personal overrides on defined trust levels (344), as will be explained below in the context of the access layer 340. In one example, as will be further understood, a trust rating of a given data requestor can be overridden by the user, e.g., company A, although having a trust level of high, is not trusted to access my financial data (maybe because of some personal experience the user had with this specific financial company). Thus, advantageously, while a particular data requestor may have a high trust level from an objective perspective, the user can provide a subjective perspective and thus still override the objective trust level.

The access layer 340 comprises a global trust index 342, trust levels 344, and access request control 346. The global trust index 342 calculates a plurality of trust ratings corresponding to a plurality of trustable data requestors registered (through registration layer 310) in the system 300. A trust rating is generated for a trustable data requester 305 based on a number of inputs from external sources 350. Examples of inputs that determine the global trust index 342 include, but are not limited to, existence of a company in government records, verification of a company's background in fraud prevention companies, the company's bankruptcy status, other users' feedback based on social media such as Facebook and Twitter, as well as the assessment level of the company from complaint sites, Internet search engine trends, company location and working area (financial, medical, security, retail, manufacturing, etc.), and company stock presence and trends.

Each of these inputs can be weighted based on predefined values. Based on the information harvested from the different sources, each item receives a rating that together with its weight is summarized in a trust rating for that company. The trust rating can have different dimensions such as, but not limited to, confidentiality, integrity, authenticity, compliance, and availability. Confidentiality is the capability of a company to keep a user's data secret and whether the data is used for the purpose for which access was granted. Integrity is the ability of a company to keep the characteristics of a user's data without modifying it. Authenticity is based on whether a company exists and performs the activities in which it claims to be engaged. Compliance is based on whether a company follows the laws, policies, and controls to which it is subjected. Availability is measured by how easy it is to contact the company, such as whether there is a customer service department.

The global trust index 342 therefore calculates the trust ratings for the companies registered in the system. These trust ratings are stored in trust levels database 344. Further, the global trust index 342 periodically refreshes the trust levels to maintain currency of the trust ratings. The trust rating of a company can also be calculated online (in real time) based on demand.

The access request control 346, functioning as part of an autonomous trust evaluation engine, decides to grant or deny access to data by a data requester based on inputs from the trust levels database 344 obtained from the global trust index 342 and from the access rules database 336. Recall also that the user can override of a trust rating (trust level) based on personal trust index 338, as explained above. The access request control 346 further considers data requester information and requested data information, as explained in conjunction with FIG. 4 below.

Figure 4:
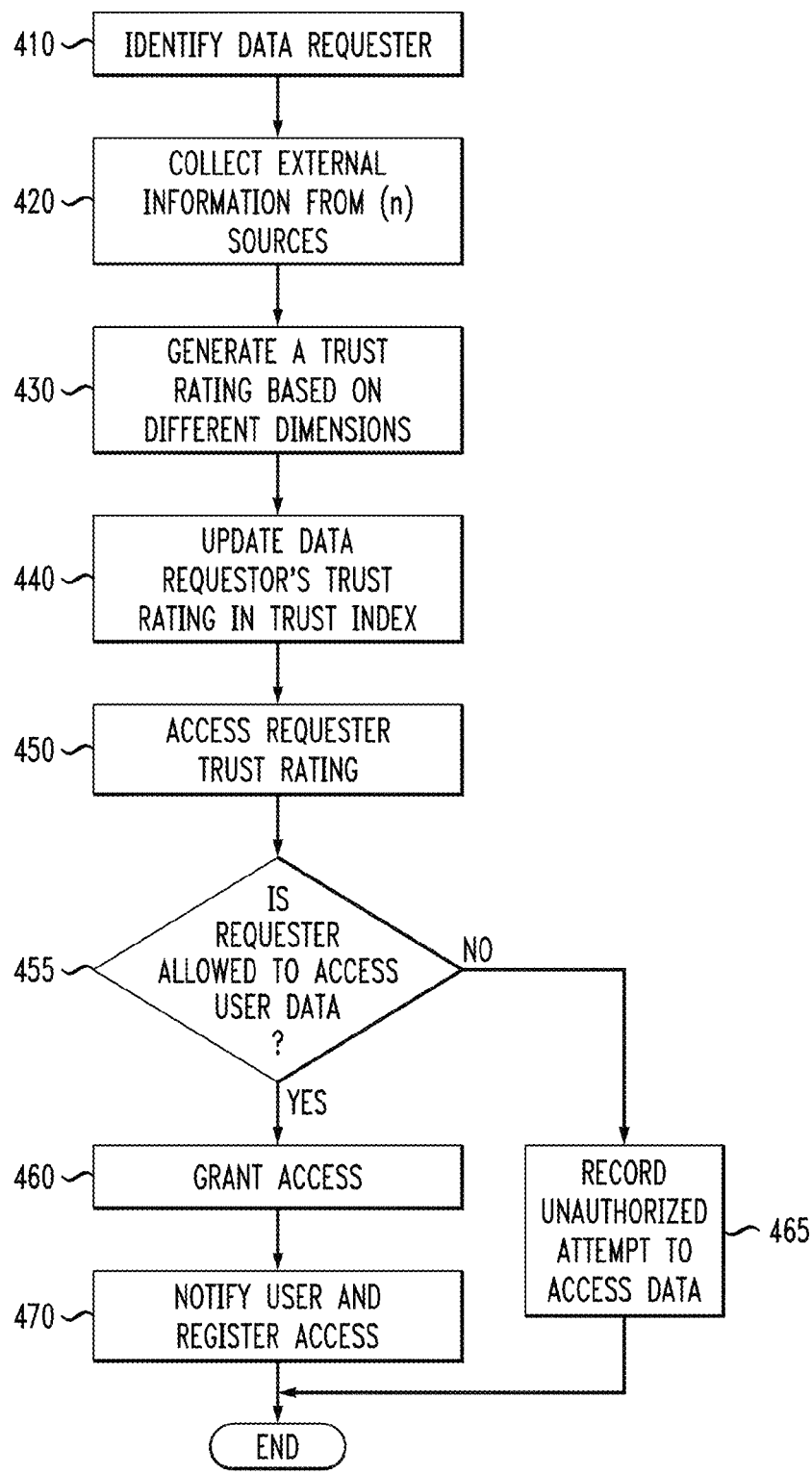
FIG. 4 illustrates a methodology for computing a trust index and granting access to data, according to an embodiment of the invention.

FIG. 4 depicts a methodology 400 for computing a trust index (trust rating/level for each data requestor registered in the system) and granting access to data based on the trust index, according to an embodiment of the invention. The data requester is identified in step 410, and external information is collected from n sources in step 420. From the information collected, a trust rating is generated based on different dimensions during step 430. In step 440, the data requester's trust rating is updated and stored in the trust levels database 344. The requester's trust rating is accessed in step 450. Then, a test is performed during step 455 to determine, based on the data requester's trust rating, if the data requester is allowed to access the user's personal data (e.g., data 210). If it is determined during step 455 that the data requester is allowed to access the user's personal data, then access is granted in step 460 and the user is notified and the access is registered in step 470. If, however, it is determined during step 455 that the data requester is not allowed to access the user's personal data, then the unauthorized attempt is recorded in step 465.

An illustrative example of evaluating a data requester's trust rating comprises a scenario of a user checking into a hospital emergency and the hospital requesting access to the user's data regarding a prior blood test. In this illustrative use case, the actors include a patient, a doctor, a hospital system, and a clinical analysis laboratory. For the purpose of simplification of explanation, a system (e.g., system 300) for controlling access to a user's private information is referred to as Personal Data Access Control System (PDACS). The pre-conditions are that the patient is registered in PDACS, the patient had the blood test and authorized PDACS access to it, and the laboratory is registered and rated in PDACS. Each of these preconditions is established using the techniques described above.

In this example, the patient checks into the hospital emergency department, and the doctor requests the previous blood test of the patient from the hospital system. The hospital system requests previous blood tests of patient from PDACS, and PDACS uses the hospital rating in its database as well as the patient's provided user information and preferences to determine if access is granted. If PDACS authorizes access to the patient's previous blood test, PDACS accesses previous blood test information from a given laboratory information system and delivers the information to the hospital system. The hospital system then presents this information to the doctor.

In an alternative example, with the same scenario as above, PDACS might deny access if the request was for a different type of data. In this alternative use case, assume the patient checks into the hospital emergency department, and the hospital system requests a credit history of the patient. PDACS uses the hospital rating in its database as well as user information and preferences to determine if access is granted. PDACS then denies access to patient credit history since it is not compatible with the hospital's activities. This alternative use case ends with a failure condition.

In yet another illustrative use case using a similar PDACS, as described above, assume that a clinical analysis laboratory is added to the global trust index. In this instance, a precondition is that the laboratory exists in a harvested system of records collected for companies (e.g., from government information system or fraud prevention company). The laboratory is identified from the system of records, together with its essential information, such as a registration number, names, and aliases. An information harvester component retrieves the available information about the laboratory, both from public sources and from partner companies that provide detailed company information.

This detailed information may include company information in government records, such as date of registration (e.g., December 1976), number of partners and their names (e.g., Alice, Bob and John), working area (e.g., medicine, clinical analysis laboratory), company background with fraud prevention companies (e.g., the laboratory has 5 complaint entries in past 10 years, all of them deemed not valid per the fraud prevention company), the company's status in bankruptcy process (not in bankruptcy), users' feedback based on social media like Facebook and Twitter, as well as an assessment level of the company from complaint sites (e.g., sentiment analysis indicates positive feedback from Facebook and Twitter, complaint site reports 10 records in the last 5 years, all of them in status resolved), Internet search engine trends (e.g., the company shows few deviations in search pattern in the last year), company location and industry working area, e.g., financial, medical, security, retail, manufacturing, etc. (e.g., located in Sao Paulo, Brazil and works in the medical area providing clinical analysis), company stock presence and trends (e.g., the company is listed in the Brazilian stock market since 1995 with no major changes in stock price in the last year, relevant information from trusted news sites (e.g., Reuters), searches for fraud and data breaches terms return no results, whether the company has a website and if it is currently accessible with information including a working customer service phone number and contact hours, and Department of Justice public information (searches for the company with respect to law compliance returns no results).

Based on the information collected, the trust rating is established for the defined dimensions. In the confidentiality dimension, there was no evidence found of data breaches in news searches, no major changes in search pattern recently, none of the complaints mentions data breach or leakage, so the laboratory is rated as high. In the integrity dimension, no evidence was found of data breaches in news searches, no complaints were found about data misuse by this company, so it is rated as high. For the authenticity dimension, the laboratory exists in the company records, it is listed in the stock market and has a registered website which is currently accessible and the website content and stock market information entries show information that matches the company's stated purpose of providing clinical analysis exams, so it is rated as high. In the compliance dimension, there was nothing found in news or the Department of Justice regarding charges pressed against the company regarding compliances, so it is rated as high. Lastly, for the availability dimension, the company has positive feedback on social networks regarding customer service, and is rated as high. The ratings (or a composite overall rating based on the ratings for each dimension) for the company are registered in the trust levels database to be consumed by the access method which will grant access based on the trust rating value.

It is to be appreciated that trust ratings/levels can be numerical on a predefined scale (e.g., 1-10, 10 being most trustworthy and 1 being least trustworthy) or the trust ratings/levels can be trust categories (e.g., high trust, medium trust, low trust). Other types of trust ratings, and combinations thereof, may be implemented in various embodiments. Users may select and/or specify what type(s) of trust ratings to use for certain data provided and/or data requestors.

Figure 5:
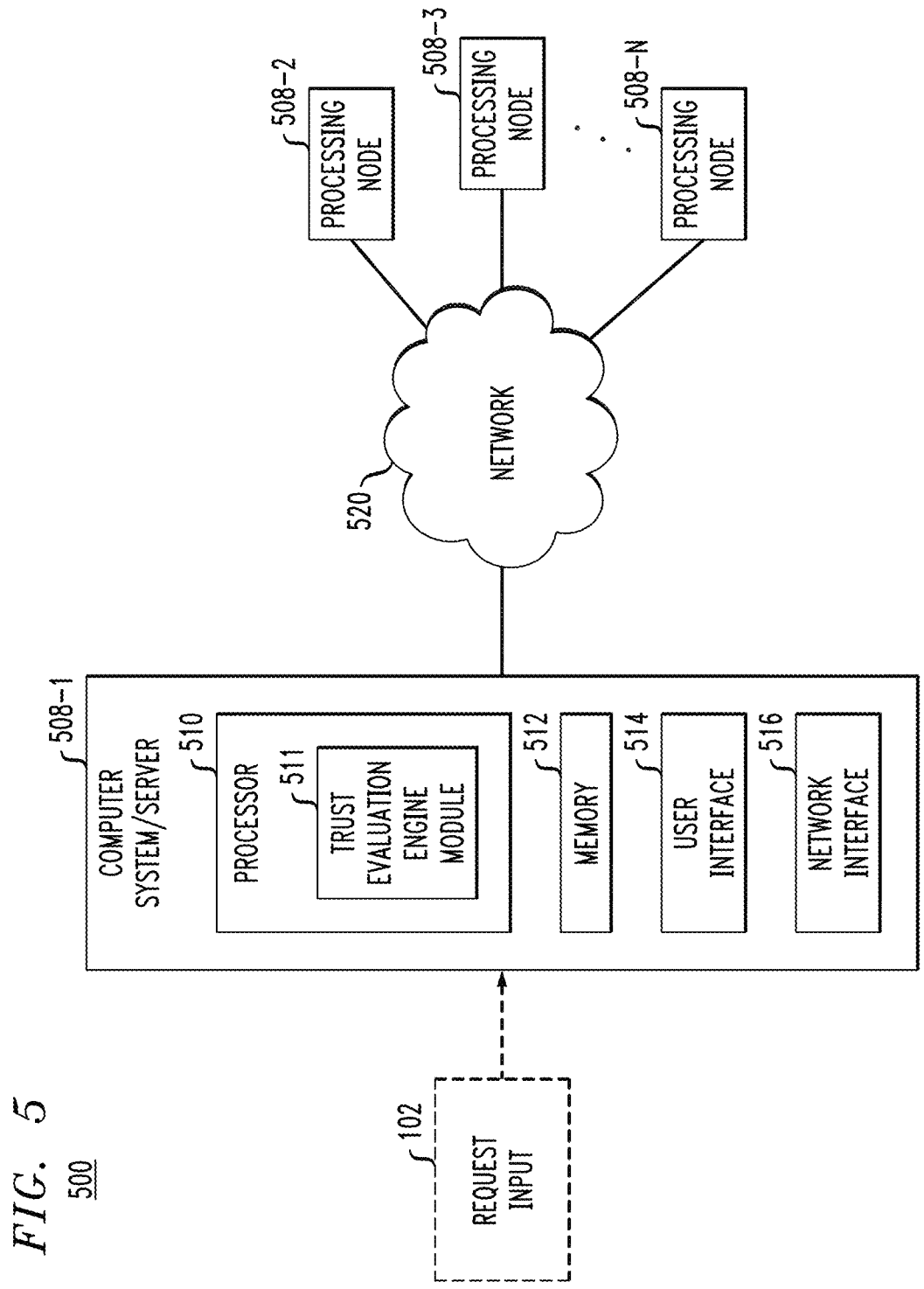
FIG. 5 illustrates a computing system for implementing the methodology of FIG. 4, according to an embodiment of the invention.

FIG. 5 depicts a computing system 500 for implementing methodology 400 of FIG. 4. System 500 comprises one or more processing nodes 508-1 . . . 508-N configured for receiving requests for data (e.g., request input 102 of FIG. 1) and also configured for communication through network 520. Each of the processing nodes 508-1 . . . 508-N may be a computer system/server 508-1, which may comprise, but is not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 508-1 may include one or more processors 510 coupled to a memory 512, a user interface 514 and a network interface 516. Processor 510 may include a trust evaluation engine module 511 configured to perform one or more steps of methodology 400 and/or other steps or functions described herein. User interface 514 may be configured to enable user input into the computer system/server 508. Network interface 516 may be configured to enable the computer system/server 508 to interface with a network 520 and other system components in a distributed network. It is to be appreciated that system 500 may include more or less components than shown in FIG. 5. Furthermore, each of the processing nodes 508-1 . . . 508-N may comprise more or less components than shown in computer system/server 508-1.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention. For example, computer system/server 508 may comprise a computer program product for implementing embodiments of the invention disclosed herein.

The computer readable storage medium (e.g., memory 512) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 520), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Processing nodes 508-1 ... 508-N of FIG. 5 are examples of cloud computing nodes. It is to be appreciated, however, that these computer systems/servers are only examples of suitable cloud computing nodes and is not intended to suggest any limitation as to the scope of use or functionality of embodiments of the invention described herein. Regardless, these computer systems/servers are examples of cloud computing nodes capable of being implemented and/or performing any of the functionality set forth hereinabove.

Figure 6:
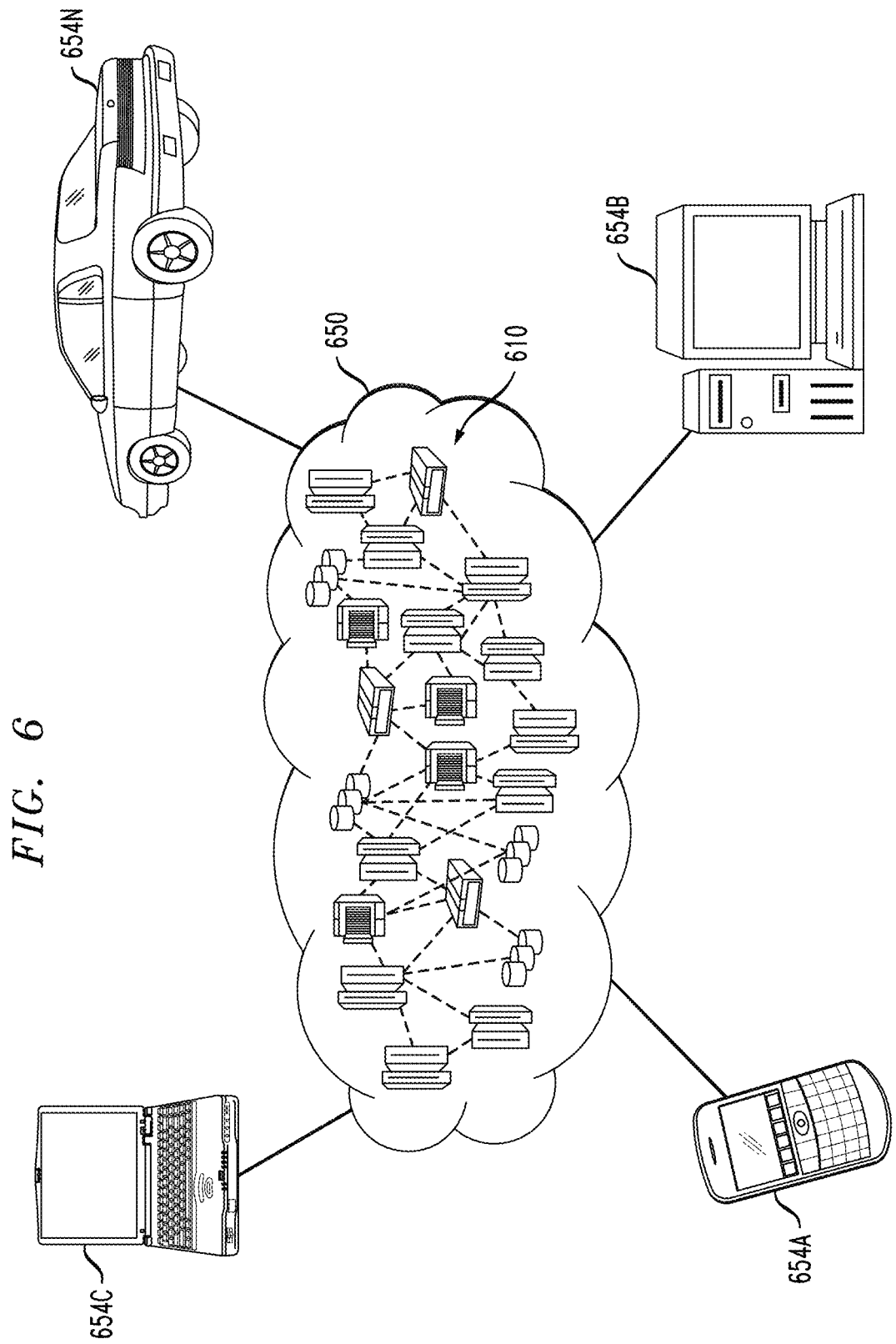
FIG. 6 illustrates a cloud computing environment, according to an embodiment of the invention.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
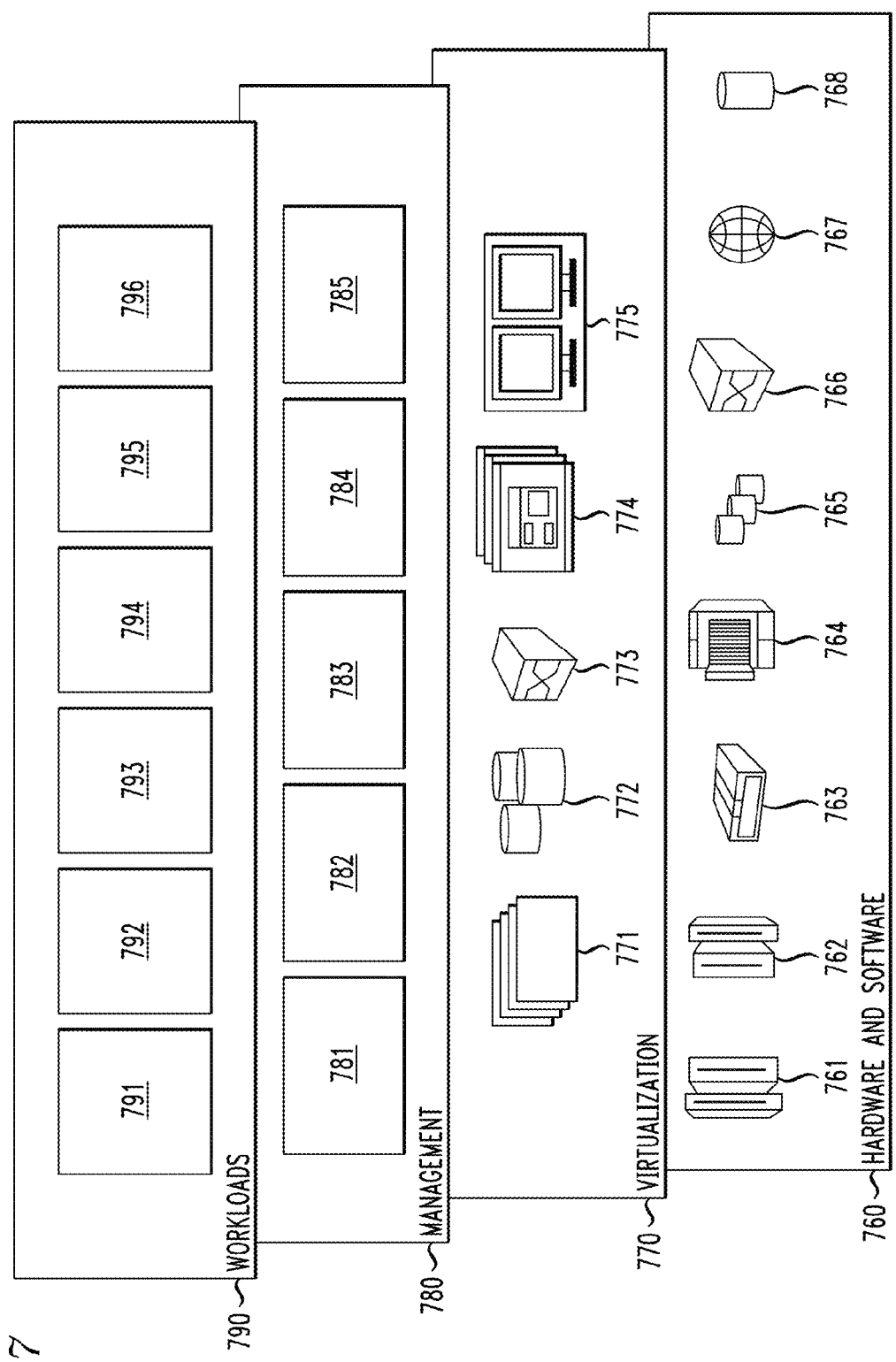
FIG. 7 illustrates abstraction model layers, according to an embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and object detection and tracking 796, which may implement the functionality described above with respect to FIGS. 1-6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
computing a trust rating for a data requester across one or more dimensions, wherein said computing comprises:
identifying said data requester;
collecting information regarding said data requester from one or more sources;
generating said trust rating for said data requester across said one or more dimensions based on said collected information;
summarizing an overall trust rating for said data requester based on said trust ratings for each of said one or more dimensions, wherein said trust ratings for each of said one or more dimensions are weighted based on pre-defined values; and
utilizing said computed trust rating to one of grant or deny a request by said data requester to access data associated with one or more data providers;
wherein the steps are performed by at least one processor device coupled to a memory, and
wherein the method further comprises the steps of:
creating and maintaining a global access rule, wherein said global access rule is maintained in a global classification layer; and
creating and maintaining a personal access rule for each of said one or more data providers, wherein said personal access rule is maintained in a personal classification layer, wherein the global access rule and personal access rule are further stored in an access rules database.

2. The method of claim 1, wherein said one or more dimensions are user-selected from a given list by said one or more data providers.

3. The method of claim 1, wherein said one or more dimensions are weighted based on pre-defined values.

4. The method of claim 1, wherein said computed trust rating is continuously updated and maintained in a trust index database.

5. The method of claim 1, further comprising the step of notifying said one or more data providers of said request to access data and registering a granted request.

6. The method of claim 1, further comprising the step of recording a denied request to access data.

7. The method of claim 1, wherein said trust rating is qualified in degrees from high to low.

8. The method of claim 1, wherein said trust rating is quantified by a numerical value with higher values indicating a higher degree of trust.

9. An apparatus comprising:
a memory and a processor operatively coupled to the memory and configured to implement the steps of:
computing a trust rating for a data requester across one or more dimensions, wherein said computing comprises:
identifying said data requester;

collecting information regarding said data requester from one or more sources;

generating said trust rating for said data requester across said one or more dimensions based on said collected information;

summarizing an overall trust rating for said data requester based on said trust ratings for each of said one or more dimensions, wherein said trust ratings for each of said one or more dimensions are weighted based on pre-defined values; and utilizing said computed trust rating to one of grant or deny a request by said data requester to access data associated with one or more data providers, wherein the processor is further configured to implement the steps of:

creating and maintaining a global access rule, wherein said global access rule is maintained in a global classification layer; and creating and maintaining a personal access rule for each of said one or more data providers, wherein said personal access rule is maintained in a personal classification layer, wherein the global access rule and personal access rule are further stored in an access rules database.

10. The apparatus of claim 9, wherein said one or more dimensions are user-selected from a given list by said one or more data providers, wherein said one or more dimensions are weighted based on pre-defined values.

11. The apparatus of claim 9, wherein said computed trust rating is continuously updated and maintained in a trust index database.

12. The apparatus of claim 9, further configured to implement the step of notifying said one or more data providers of said request to access data and registering a granted request.

13. A computer program product comprising a non-transitory computer readable storage medium for storing computer readable program code which, when executed, causes a computer to:

compute a trust rating for a data requester across one or more dimensions, wherein said computing comprises:

identifying said data requester;

collecting information regarding said data requester from one or more sources;

generating said trust rating for said data requester across said one or more dimensions based on said collected information;

summarizing an overall trust rating for said data requester based on said trust ratings for each of said one or more dimensions, wherein said trust ratings for each of said one or more dimensions are weighted based on pre-defined values; and utilize said computed trust rating to one of grant or deny a request by said data requester to access data associated with one or more data providers, wherein the computer is further caused to:

create and maintain a global access rule, wherein said global access rule is maintained in a global classification layer; and create and maintain a personal access rule for each of said one or more data providers, wherein said personal access rule is maintained in a personal classification layer, wherein the global access rule and personal access rule are further stored in an access rules database.

* * * * *